(12) United States Patent
Kuzmich et al.

(10) Patent No.: US 7,760,904 B2
(45) Date of Patent: *Jul. 20, 2010

(54) PROPRIETARY WATERMARK SYSTEM FOR SECURE DIGITAL MEDIA AND CONTENT DISTRIBUTION

(75) Inventors: Vsevolod M. Kuzmich, St. Petersburg (RU); Igor O. Ivanov, St. Petersburg (RU)

(73) Assignee: LG Electronics Inc., Seoul (KR)

( * ) Notice: Subject to any disclaimer, the term of this patent is extended or adjusted under 35 U.S.C. 154(b) by 1114 days.

This patent is subject to a terminal disclaimer.

(21) Appl. No.: 11/415,120

(22) Filed: May 2, 2006

(65) Prior Publication Data

US 2006/0193492 A1    Aug. 31, 2006

Related U.S. Application Data

(63) Continuation of application No. 10/078,273, filed on Feb. 20, 2002, now Pat. No. 7,043,051.

(60) Provisional application No. 60/269,863, filed on Feb. 21, 2001.

(51) Int. Cl.
  *G06K 9/00* (2006.01)
(52) U.S. Cl. .................. 382/100; 380/259; 380/277
(58) Field of Classification Search .................. 382/100
  See application file for complete search history.

(56) References Cited

U.S. PATENT DOCUMENTS 5,499,294 A * 3/1996 Friedman .................... 713/179
5,530,751 A   6/1996 Morris
5,568,570 A   10/1996 Rabbani
5,659,726 A   8/1997 Sandford, II et al.
5,673,316 A * 9/1997 Auerbach et al. ............. 705/51
5,809,139 A   9/1998 Girod et al.
5,848,155 A   12/1998 Cox
5,930,369 A   7/1999 Cox et al.
5,940,507 A   8/1999 Cane et al.
5,949,055 A   9/1999 Fleet et al.
5,974,150 A   10/1999 Kaish et al.
5,995,625 A * 11/1999 Sudia et al. ................... 705/51
6,002,772 A * 12/1999 Saito ........................... 705/58
6,005,643 A   12/1999 Morimoto et al.

(Continued)

OTHER PUBLICATIONS

Jian Zhao, "Applying Digital Watermarking Techniques to Online Multimedia Commerce", In: Proc. of the International Conference on Imaging Science, Systems, and Applications (CISSA97), Jun. 30-Jul. 3, 1997, Las Vegas, USA.*

(Continued)

*Primary Examiner*—Sath V Perungavoor
(74) *Attorney, Agent, or Firm*—Birch, Stewart, Kolasch & Birch, LLP

(57) ABSTRACT

A method of generating a protected digital media content, is provided. According to an embodiment of the present invention, the method includes generating a protected digital media content, comprising: generating a first control signal for use in an authorization signature of digital media content, generating a second control signal for use in a certification of the content owner's right, and generating information about the digital media content; and adding the first control signal, the second control signal, and the information to the digital media content to provide a protected content.

7 Claims, 2 Drawing Sheets

U.S. PATENT DOCUMENTS

| | | | |
|---|---|---|---|
| 6,021,196 A | 2/2000 | Sandford, II et al. | |
| 6,044,462 A | 3/2000 | Zubeldia et al. | |
| 6,101,602 A | 8/2000 | Fridrich | |
| 6,141,753 A * | 10/2000 | Zhao et al. | 713/176 |
| 6,148,342 A | 11/2000 | Ho | |
| 6,154,571 A | 11/2000 | Cox et al. | |
| 6,160,891 A | 12/2000 | Al-Salqan | |
| 6,182,218 B1 * | 1/2001 | Saito | 713/176 |
| 6,226,618 B1 * | 5/2001 | Downs et al. | 705/51 |
| 6,229,894 B1 | 5/2001 | Van Oorschot et al. | |
| 6,240,121 B1 | 5/2001 | Senoh | |
| 6,243,480 B1 * | 6/2001 | Zhao et al. | 382/100 |
| 6,246,767 B1 | 6/2001 | Akins, III et al. | |
| 6,256,347 B1 | 7/2001 | Yu et al. | |
| 6,259,801 B1 * | 7/2001 | Wakasu | 382/100 |
| 6,269,446 B1 * | 7/2001 | Schumacher et al. | 713/176 |
| 6,272,253 B1 | 8/2001 | Bannon et al. | |
| 6,285,775 B1 | 9/2001 | Wu et al. | |
| 6,310,956 B1 | 10/2001 | Morito et al. | |
| 6,358,596 B1 | 3/2002 | Mehta et al. | |
| 6,367,019 B1 | 4/2002 | Ansell et al. | |
| 6,385,596 B1 | 5/2002 | Wiser et al. | |
| 6,389,403 B1 | 5/2002 | Dorak, Jr. | |
| 6,397,333 B1 * | 5/2002 | Sohne et al. | 713/176 |
| 6,398,245 B1 | 6/2002 | Gruse et al. | |
| 6,404,926 B1 | 6/2002 | Miyahara et al. | |
| 6,418,232 B1 | 7/2002 | Nakano et al. | |
| 6,418,421 B1 | 7/2002 | Hurtado et al. | |
| 6,549,626 B1 | 4/2003 | Al-Salqan | |
| 6,550,011 B1 | 4/2003 | Sims, III | |
| 6,577,745 B1 | 6/2003 | Op De Beeck et al. | |
| 6,584,210 B1 | 6/2003 | Taguchi et al. | |
| 6,611,599 B2 | 8/2003 | Natarajan | |
| 6,611,607 B1 | 8/2003 | Davis et al. | |
| 6,633,723 B1 | 10/2003 | Kuroda et al. | |
| 6,643,383 B1 | 11/2003 | Dugelay | |
| 6,665,420 B1 | 12/2003 | Xie et al. | |
| 6,678,389 B1 | 1/2004 | Sun et al. | |
| 6,678,464 B1 | 1/2004 | Kawai et al. | |
| 6,687,822 B1 | 2/2004 | Jakobsson | |
| 6,707,774 B1 | 3/2004 | Kuroda et al. | |
| 6,711,276 B1 | 3/2004 | Yoshiura et al. | |
| 6,711,679 B1 * | 3/2004 | Guski et al. | 713/156 |
| 6,728,379 B1 * | 4/2004 | Ishibashi et al. | 380/278 |
| 6,741,991 B2 * | 5/2004 | Saito | 1/1 |
| 6,775,382 B1 | 8/2004 | Al-Salqan | |
| 6,802,011 B1 | 10/2004 | Ogino et al. | |
| 6,834,110 B1 * | 12/2004 | Marconcini et al. | 380/239 |
| 6,834,346 B1 * | 12/2004 | Ishibashi et al. | 713/179 |
| 6,853,676 B2 | 2/2005 | Kim et al. | |
| 6,880,083 B1 * | 4/2005 | Korn | 713/170 |
| 6,891,958 B2 * | 5/2005 | Kirovski et al. | 382/100 |
| 6,996,251 B2 * | 2/2006 | Malone et al. | 382/100 |
| 7,000,113 B1 | 2/2006 | Linnartz et al. | |
| 7,002,710 B1 | 2/2006 | Van Liew et al. | |
| 7,043,051 B2 * | 5/2006 | Kuzmich et al. | 382/100 |
| 7,047,554 B1 | 5/2006 | Lortz | |
| 7,062,045 B2 * | 6/2006 | Riddick et al. | 380/44 |
| 7,100,048 B1 | 8/2006 | Czajkowski et al. | |
| 7,203,335 B2 | 4/2007 | Fielding et al. | |
| 7,224,805 B2 * | 5/2007 | Hurst et al. | 380/285 |
| 7,254,838 B2 | 8/2007 | Kim et al. | |
| 7,568,096 B2 * | 7/2009 | Evans et al. | 713/157 |
| 7,630,511 B2 * | 12/2009 | Zhao et al. | 382/100 |
| 2001/0010046 A1 | 7/2001 | Muyres et al. | |
| 2001/0032312 A1 | 10/2001 | Runje et al. | |
| 2001/0046307 A1 * | 11/2001 | Wong | 382/100 |
| 2001/0053223 A1 | 12/2001 | Ishibashi et al. | |
| 2002/0010861 A1 | 1/2002 | Matsuyama et al. | |
| 2002/0021805 A1 | 2/2002 | Schumann et al. | |
| 2002/0048372 A1 * | 4/2002 | Toh et al. | 380/285 |
| 2002/0059238 A1 * | 5/2002 | Saito | 707/9 |
| 2002/0071566 A1 | 6/2002 | Kurn | |
| 2002/0118838 A1 | 8/2002 | Belenko et al. | |
| 2002/0191809 A1 * | 12/2002 | Kirovski et al. | 382/100 |
| 2003/0007646 A1 * | 1/2003 | Hurst et al. | 380/285 |
| 2003/0046238 A1 * | 3/2003 | Nonaka et al. | 705/51 |
| 2003/0048922 A1 | 3/2003 | Rhoads | |
| 2003/0163684 A1 * | 8/2003 | Fransdonk | 713/153 |
| 2003/0202659 A1 * | 10/2003 | Rodriguez | 380/201 |
| 2003/0202679 A1 * | 10/2003 | Rodriguez | 382/100 |
| 2003/0223614 A1 * | 12/2003 | Robins et al. | 382/100 |
| 2004/0034781 A1 | 2/2004 | Natarajan | |
| 2004/0059936 A1 | 3/2004 | Wakao et al. | |
| 2004/0120527 A1 * | 6/2004 | Hawkes et al. | 380/277 |
| 2004/0131184 A1 | 7/2004 | Wu et al. | |
| 2005/0018873 A1 | 1/2005 | Rhoads | |
| 2005/0025316 A1 * | 2/2005 | Pelly et al. | 380/277 |
| 2005/0036651 A1 * | 2/2005 | Wen | 382/100 |
| 2005/0058318 A1 | 3/2005 | Rhoads | |
| 2005/0097333 A1 * | 5/2005 | Kirovski et al. | 713/176 |
| 2005/0097334 A1 * | 5/2005 | Kirovski et al. | 713/176 |
| 2005/0169498 A1 * | 8/2005 | Choi et al. | 382/100 |
| 2005/0196013 A1 | 9/2005 | Rhoads | |
| 2006/0204032 A1 | 9/2006 | Nakamura et al. | |
| 2006/0242418 A1 * | 10/2006 | Willamowski et al. | 713/176 |
| 2007/0014354 A1 | 1/2007 | Murakami et al. | |
| 2009/0132825 A1 * | 5/2009 | Mohanty | 713/176 |

OTHER PUBLICATIONS

Bender et al.. Techniques for data hiding IBM Systems Journal, vol. 35, No. 3&4, 1996, pp. 313-336.

Hartung et al., "Multimedia Watermarking Techniques", Proceedings of the IEEE, vol. 87, No. 7, Jul. 1999, pp. 1079-1107.

Wolfgang et al., "Overview of image security techniques with applications in multimedia systems", Proceedings of the SPIE Conference on Multimedia Networs: Security, Displays, Terminals, and Gateways, vol. 3228, Nov. 2-5, 1997, pp. 297-308.

\* cited by examiner

PROPRIETARY WATERMARK SYSTEM FOR SECURE DIGITAL MEDIA AND CONTENT DISTRIBUTION

CROSS-REFERENCE TO RELATED APPLICATIONS

This application is a Continuation of application Ser. No. 10/078,273 (now allowed) filed on Feb. 20, 2002 now U.S. Pat. No. 7,043,051, which claims the benefit of U.S. Provisional Application No. 60/269,863, filed on Feb. 21, 2001, in the name of inventors Vsevolod M. Kuzmich and Igor 0. Ivanov, titled "Propriety Watermark System for Secure Digital Media and Content Distribution". The entire contents of each of these applications are hereby incorporated by reference as if fully set forth herein.

BACKGROUND OF THE INVENTION

1. Field of the Invention

The present invention relates to media protection systems, and more particularly, to a digital media/content protection system that provides the protection of the media owner's copyright during a media/content distribution process using cryptographic and watermarking techniques.

2. Discussion of the Related Art

In today's digital world, there is a great wealth of information that can be accessed in various forms: text, image, audio, and video. The relationships within the digital content triangle, "Owner, Distributor, and Customer" have become more and more complicated. The electronic representation and transfer of the digital media and content have increased the potential for any misuse and theft of such information and have significantly increased the problems associated with the enforcement of the copyright protection of such information.

These problems are rooted from the intrinsic features of the digital information: making copies of the information is easy and inexpensive, each copy is identical to the original (no quality loss), and the distribution of the copies is easy and fast. For these reasons, the authors and publishers of multimedia materials fear providing their works in the multimedia services and are seeking the solutions that can eliminate the problems associated with the copyright protection of the multimedia data. Thus, to preserve the digital media originality and to provide the security and copyright of the media, their distribution became a very important issue. There are two major techniques that are involved when providing a protection of the digital media: cryptography and digital watermarking.

Cryptography is a technology that is widely used for providing the data security. Relating to digital media, cryptography is used to provide the security of the access to copyright information access among the media managers in the Owner-Distributor-Consumer triangle. There are two main classes of cryptographic systems: symmetric key and public key (asymmetric key) encryption systems. A hybrid cryptographic system is a system in which both classes of systems are combined.

In a symmetric key encryption system, a single key can be used both to encrypt and decrypt. There are several efficient implementations of the symmetric key systems, but their key management is often troublesome.

In a public key encryption system, the processes of the data encryption and decryption are independent from each other. The data encryption process employs a public key, while the data decryption process requires a different (but mathematically related) private key. Knowing of the public key allows the encryption of a plaintext but does not allow the decryption of a ciphertext: the private key is necessary for the ciphertext decryption. A key owner keeps his private key secrete so that he is the only person who can decrypt a encrypted ciphertext and sign the digital data using his private key. If the key owner publishes his public key, then anyone can use that key to encrypt messages for the key owner and to verify the owner signature.

In a hybrid cryptographic system, a plaintext is encrypted with a symmetric algorithm having a symmetric key. The symmetric key itself is encrypted with a public-key algorithm having a public key. The encrypted symmetric key and data are then delivered to a recipient, who uses his private key to decrypt the symmetric key and uses the decrypted key to decrypt the data. This process is considerably faster than a public key encryption system, and it allows using a different symmetric key each time, considerably enhancing the security of the symmetric algorithm. Thus, the hybrid cryptographic system is ideal for transferring the protected media to a user.

Digital watermarking is a technology that is used for embedding copyright information data into various forms of media such as image, audio, and video with a minimum amount of perceivable degradation of the "host" signal. The embedded data should be invisible and inaudible to a human observer. The digital watermarking technology is often used to modify the played and recorded media signals and to keep track of a list of the involved playing or recording devices in order to detect any illegal copy maker. Using the technology, one can distinguish legal media from the illegal media copies. The purpose of embedding the copyright information into the digital media is to provide a proof of the copyright and assurance of the content integrity. Therefore, the embedded data should stay stable in a host signal even if the host signal is processed. Such a hidden and stable data, securely placed into a "host" signal to store the essential supplementary information, is called a watermark.

A watermarking process includes three basic stages: generating a watermark, embedding the watermark, and detecting the watermark. A watermark belongs to one owner who is the only person who can proceed to prove the ownership of the host signal.

SUMMARY OF THE INVENTION

Accordingly, the present invention is directed to a copyright protection method for digital media in a media distribution process.

An object of the present invention is to provide a copyright protection method for digital medialcontent that (1) properly protects the copyrights of the media content owner, (2) reliably preserves and proves the originality of the digital media, and (3) provides the security of the medialcontent distribution process.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a first copyright protection method for digital media includes embedding a secrete watermark into an original media content, the secrete watermark being generated with a secrete key of a content owner and representing an authorization signature of the owner; embedding a first public watermark into the secrete watermark-embedded media content, the first public watermark being generated with a first private key of the owner and certifying a first copyright of the owner; and embedding a second public watermark into the first public watermark-embedded media content, the second public watermark being generated with a second private key of a content distributor and certifying a second copyright of the distributor.

In another aspect of the present invention, a second copyright method for digital media includes embedding a secrete watermark into an original media content, the secrete watermark being generated with a secrete key of a content owner and representing an authorization signature of the owner; embedding a first public watermark into the secrete watermark-embedded media content, the first public watermark being generated with a first private key of the owner and certifying a first copyright of the owner; embedding an informational watermark into the first public watermark-embedded media content, the informational watermark including additional information related to the original content; and embedding a second public watermark into the informational watermark-embedded media content, the second public watermark being generated with a second private key of a content distributor and certifying a second copyright of the distributor.

According to another aspect, the present invention provides a method of generating a protected digital media content, comprising: generating a first control signal for use in an authorization signature of digital media content, generating a second control signal for use in a certification of the content owner's right, and generating information about the digital media content; and adding the first control signal, the second control signal, and the information to the digital media content to provide a protected content.

According to another aspect, the present invention provides a method of generating a protected digital media content, comprising: generating a first control signal for use in an authentication and/or content integrity, and associating the first control signal with digital media content; generating a second control signal for use in a certification of the content owner's right, and associating the second control signal with the digital media content; and generating information about the digital media content, and associating the information with the digital media content.

According to another aspect, the present invention includes a method of reproducing a digital media content, comprising: (a) receiving a protected content and an associated control data; (b) checking an authorization signature of the protected content by using a first control signal; (c) checking a certification of the protected content owner's right by using a second control signal; and (d) identifying information about the protected content to reproduce the protected content.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

The present invention relates to a copyright protection method of the digital media and the digital content distribution. It is applicable to all types of media, and the principles of the present invention may be extended by one having ordinary skill in the art to any new types. The present invention offers a high-level protection to multimedia right owners. It further offers a use of three subjects of digital media distribution process: a content owner, a content distributor, and a content consumer.

First of all, the content owner is a subject who produces and owns an original media copy (original content). The content owner can distribute the copies of the original content and certify his copyright by digitally signing the copies. Second, the content distributor is a subject who receives the copies of the original content from the content owner and has a right to redistribute the copies to one or more consumers or to other distributors. The content distributor can also certify his copyright by digitally signing the distributed content. Lastly, the content consumer is a subject who receives the copies of the original content from the content owner or content distributor for his or her personal use.

When a copyright owner signs the digital media materials produced, it is essential to choose a proper technique for digital content signing. One of the ways of signing a digital content is digital watermarking. Digital watermarking allows keeping the indelible marks within the media data, and these marks could be used to indicate the owner's copyright. The copyright must be distributed with the media content to indicate the content owner's right. The present invention offers to store the copyright data in the form of a digital watermark into the content Each owner of the copy of the content can add his or her own watermark as an owner data indicating his or her copyright corresponding to the content.

Figure 1:
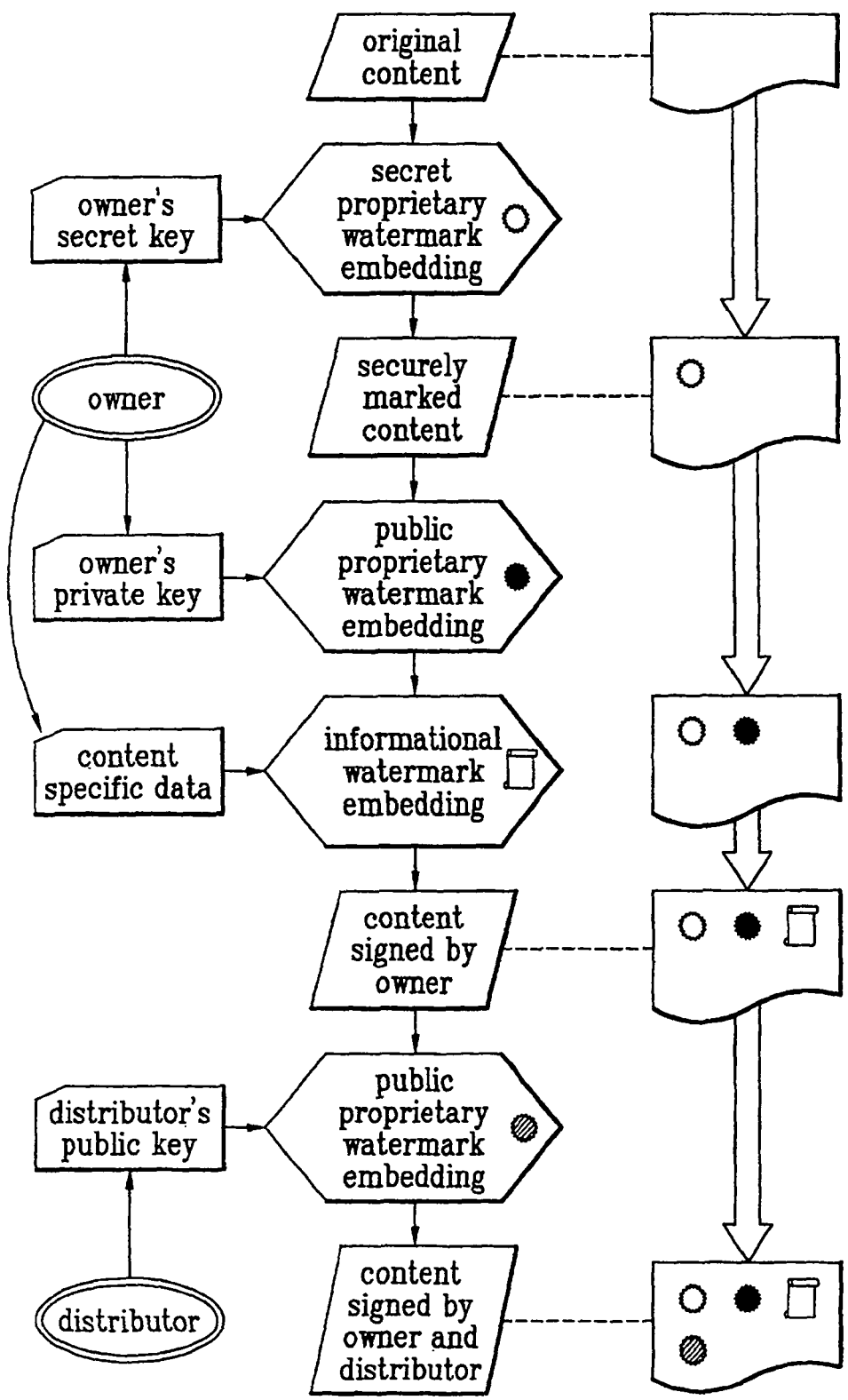
FIG. 1 is a flow chart illustrating the copyright protection method according to the present invention.

The present invention offers three ways to protect the copyright of digital media during the digital media distribution in accordance with a secrecy level: secrete, public, and informational proprietary copyright protection schemes. A copyright protection method of the present invention is illustrated in FIG. 1. The system shown in FIG. 1 employs a combination of all of three schemes and can be used for the security level assignment among the content distribution participants. As mentioned above, the main parts of the content distribution participants are a content owner, a content distributor, and a content consumer.

The content owner adds a secrete watermark (owner secrete watermark) into an original media content using his own secrete key. The secrete watermark represents an owner authorization signature for the media content. This watermark can be distinguished only by the secrete key owner. Then, the content owner adds a public watermark (owner public watermark) that allows to certify the owner' right and to check it by any third party, who has an owner public key (public key 1). Additionally, the content owner adds an informational watermark that allows to store additional content information (content properties) within the media content. Anyone can read this information without any access key by using a special software tool.

After the content preparation processes described above are performed, the content owner hands the owner-watermarked content over to the content distributor. Then the content distributor adds his own public watermark (distributor public watermark) into the owner watermarked content that allows to certify his copyright and to check it by any third party, who has a distributor public key (public key 2). The consumer can get an informational watermark without any key and any public watermark by using a corresponding public key.

Figure 2:
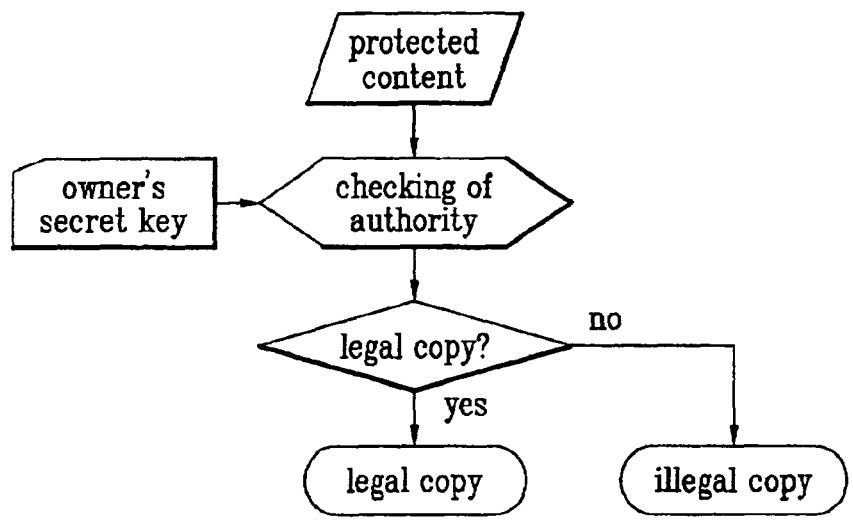
FIG. 2 is a flow chart illustrating a method of verifying the validity of a media content by using a secrete proprietary watermarking technique according to the present invention.

FIG. 2 is a flow chart illustrating a method of verifying the validity of a media content by using the secrete proprietary watermarking technique according to the present invention. The secrete proprietary copyright protection scheme is based on the symmetric cryptography (using a secrete key) and digital watermarking principles. Secrete proprietary watermarks can be used as the authentication and content integrity mechanisms in a variety of ways. This implies that the watermark is a secured link and readable only by the authorized persons having the secrete key, which was used to generate the watermark. Removing this type of watermark should be possible with a heavy degradation of the carrier signal. In order to detect this type of watermark, a secrete key and an owner identification (ID) must be known. Thus, only a content owner who knows the secrete key and owner ID is able to operate with a secrete proprietary watermark. The main goals of the method shown in FIG. 1 are as follows:

Distinguish the presence of the watermark within the content and illicit copying disclosure Conserve ancillary owner information within watermarked content Protect owner information embedded into the content from unauthorized access and modifications The requirements of the secrete proprietary copyright protection security are as follows:

An appropriate symmetric key cryptography algorithm must be used.

A digital watermarking technique that provides robust watermark embedding and detection must be used.

It must be possible to authenticate a watermark message with only the watermarked content, the secrete watermarking key, and the owner ID.

Authentication or the failure to authentication of the watermark message must survive the subsequent encoding with the same or other watermarking process.

A digital watermarking system should be implementable by an individual content creator, where authentication of the watermarked content is possible by any third party.

In a digitized form, the content should only be distributed with watermarks if the watermarks are expected to provide authentication.

This scheme assumes that the owner of the content has to specify some information for the watermarking process. The first part of the data is Delimiter generated on the basis of the owner ID. It allows to divide the different content owners' or redistributors' watermarks from each other. The second part of the data is owner data that the owner wants to associate with the current copy of the content. This is an information part of the watermark. The third part of the data is an owner secrete key (So) that is used as a basis of the symmetric cryptographic scheme protecting the watermark data itself from the illegal use.

A copyright protection apparatus compounds the watermark from the mentioned parts of the data in a manner that different content owners or redistributors have the different watermarks. The next step is to code each informational bit of the watermark according to the selected watermarking technique and embedding the obtained signal into the content The owner ID is used to detect the watermark within the watermarked content In a case of successful detection, the owner secrete key (So) must be produced to encode the watermark and obtain the plain owner data.

Figure 3:
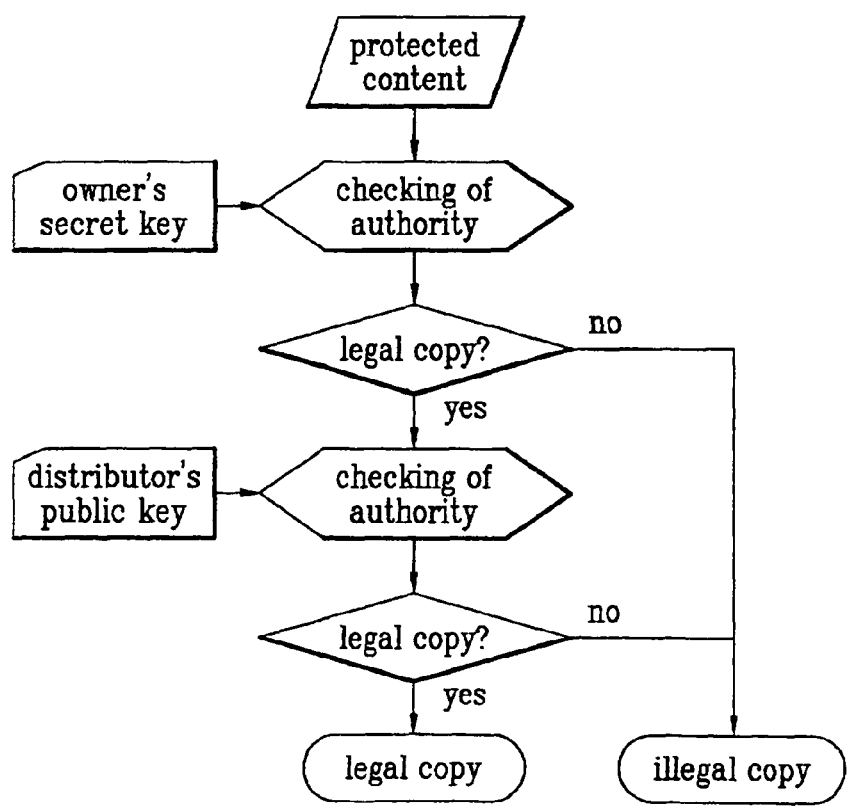
FIG. 3 is a flow chart illustrating a method of verifying the validity of a media content by using a public proprietary watermarking technique according to the present invention.

FIG. 3 is a flow chart illustrating a method of verifying the validity of a media content by using a public proprietary watermarking technique according to the present invention. The public proprietary copyright protection method is based on the public key cryptographic principles. By the definition, the public copyright protection embeds a traditional copyright notice into a signal with an owner private key. It is expected that the owner officially publishes the corresponding public key so that anyone can read it and check the watermark. Although the public copyright protection is bit less secure that secrete one, it is much more difficult to remove a visible/audible label. Moreover, the failure of the public watermark detection indicates that the signal has been significantly tampered, and the user can be informed of the alteration.

The main goals of the method shown in FIG. 2 are as follows:

Distinguish the presence of the watermark within the content

Conserve ancillary owner information (possibly including content properties) within the watermarked content Protect the owner information embedded into the content from any unauthorized access and modifications Provide any third party (having the public key) with an opportunity to get the content properties.

The requirements of the public copyright protection security are as follows:

An appropriate symmetric-key cryptographic algorithm much be selected.

A digital watermarking technique that provides the robust watermark embedding and detection must be selected.

It must be possible to authenticate a watermark message with only the watermarked content, the public key and the owner ID.

Authentication or a failure to authenticate of the watermark message must survive the subsequent encoding with the same or other watermarking processes.

A digital watermarking system should be implemented by an individual content creator, where the authentication of the watermarked content can be done by any third party In a digitized form, the content should only be distributed with watermarks if the watermarks are expected to provide the authentication.

The public proprietary copyright protection shown in FIG. 3 assumes that the owner of the content has to specify some information for watermarking forming. The first part of the data is delimiter generated on the basis of the owner identification (ID). It allows to divide the different content owners' or distributors' watermarks from each other. The second part if owner data that the owner wants to associate with the current copy of the content. This is an informational part of the watermark. The third part of the data is an owner public key (Po) that is used as a basis of an asymmetric cryptography scheme protecting the plain owner data itself from the illegal use.

The copyright protection system compounds the watermark from the mentioned parts of data in a manner that different content owners or redistributors have the different watermarks. The next steps are to code each informational bit of the watermark according to a selected watermarking technique and to embed the obtained signal into the content.

The owner ID and owner public key (Po) are used to detect the watermark within the watermarked content, and in a case of successful detection, the owner public key (Po) is used to encode the watermark and to obtain the plain owner data. The owner public key (Po) and owner ID have to be passed to the content distributor or another content owner, and anyone who received the key can select and view the data that are concerned to the corresponding content owner or distributor.

The informational copyright protection scheme according to the present invention acts as an information carrier with the watermark readable to anyone. These watermarks are detectable by a third party using a special embedded tool of a media player (e.g., a Properties button). The informational watermarks mainly act as information links. Therefore, these links do not need to fulfill the same security constraints as the watermarks formed in the secret copyright protection schemes. The information copyright protection scheme allows free validity detection: it does not need an original media data and any secrete key to determine the presence of a watermark.

The main goals of the scheme are to distinguish the presence of the watermark within the content and to inform a customer about the content owner and content properties (e.g., title, artist, date, version, media parameters such as bit-rate, and etc.).

Some of the requirements of the informational copyright protection security are as follows:

An appropriate symmetric key cryptographic algorithm must be selected.

A digital watermarking technique that provides the robust watermark embedding and detection must be selected.

It must be possible to authenticate a watermark message with the watermarked content by using a special software module.

A digital watermarking system should be implementable by an individual content creator, where the authentication of the watermarked content can be done by any third party.

In a digitized form, the content should be distributed only with the watermarks if the watermarks are expected to provide authentication.

This scheme assumes that the content owner needs to specify some information for a public use. So, it is possible to associate the information with the content using a watermarking technique without any cryptographic features. This information is related rather to the content itself than the content owner. No key is necessary to find and read the information.

If a content owner wants to redistribute the original content to a content distributor or another content owner with all the copyrights related to the content, it is possible to set Trusted Relationships between two parties. It means that the content owner has to pass his secrete key and owner ID to another party, e.g., by using a hybrid cryptographic scheme.

For confidentiality purposes, the message is (symmetrically) encrypted with a randomly generated session key, and this session key is encrypted with the public key of a receiver. This public-key-encrypted session key is sent along with the encrypted (symmetrical) message to the receiver. Then the receiver uses his private key to find the session key and decrypts the message using the found session key. By signing a short digest (hash) instead of the whole message, the integrity can be efficiently realized by a hybrid system.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A computer implemented method of generating digital media content, comprising:
   generating a first control signal by using a first key of a content owner, the first control signal being for use in an authorization signature of the content owner;
   embedding the first control signal into the digital media content;
   generating a second control signal by using a second key of the content owner, the second signal being for use in a certification of the content owner's right;
   embedding the second control signal into the digital media content;
   generating content information including additional information related to the digital media content;
   embedding the content information into the digital media content;
   generating a third control signal by using a public key of the content distributor, the third control signal being for use in a certification of the content distributor; and
   embedding the third control signal into the digital media content.

2. The method of claim 1, wherein the first key is a secret key of the content owner.

3. The method of claim 1, wherein the first control signal is generated based on a symmetric cryptography.

4. The method of claim 1, wherein the second key is a public key of the content owner.

5. The method of claim 1, wherein the content information represents content properties.

6. The method of claim 1, further comprising:
   transmitting the digital media content from the first device to a content distributor of the digital media content.

7. A computer implemented method of reproducing digital media content, comprising:
   checking an authorization signature of a content owner by using a first control signal embedded into the digital media content, the first control signal being generated with a secret key of the content owner;
   checking a certification of the content owner's right by using a second control signal embedded into the digital media content, the second control signal being generated with a public key of the content owner;
   identifying content information embedded into the digital media content to reproduce the digital media content, the content information including additional information related to the digital media content;
   reproducing the digital media content when the authorization signature of the content owner and the certification of the content owner's right are confirmed;
   checking a certification of a content distributor by using a third control signal embedded into the digital media content, the third control signal being generated with a public key of the content distributor; and
   reproducing the digital media content when the certification of the content distributor is confirmed.

* * * * *